(12) United States Patent
Na et al.

(10) Patent No.: US 10,018,777 B2
(45) Date of Patent: Jul. 10, 2018

(54) CIRCUIT BOARD AND LIGHTING DEVICE AND BOARD HOUSING MODULE HAVING THE CIRCIUT BOARD

(71) Applicant: LG INNOTEK CO., LTD., Seoul (KR)

(72) Inventors: Se Woong Na, Seoul (KR); Min Jae Kim, Seoul (KR); Bi Yi Kim, Seoul (KR); Hyun Gyu Park, Seoul (KR); In Hee Cho, Seoul (KR); Man Hue Choi, Seoul (KR); Seung Kwon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 136 days.

(21) Appl. No.: 14/894,628

(22) PCT Filed: May 8, 2014

(86) PCT No.: PCT/KR2014/004067
§ 371 (c)(1),
(2) Date: Nov. 30, 2015

(87) PCT Pub. No.: WO2014/193094
PCT Pub. Date: Dec. 4, 2014

(65) Prior Publication Data
US 2016/0124141 A1    May 5, 2016

(30) Foreign Application Priority Data
May 31, 2013    (KR) .................. 10-2013-0062936

(51) Int. Cl.
*F21V 8/00*         (2006.01)
*G02F 1/1335*       (2006.01)
(Continued)

(52) U.S. Cl.
CPC .............. *G02B 6/0091* (2013.01); *F21S 4/28* (2016.01); *G02B 6/0088* (2013.01);
(Continued)

(58) Field of Classification Search
CPC .. G02B 6/0073; G02B 6/0081; G02B 6/0083; G02B 6/0086; G02B 6/0088;
(Continued)

(56) References Cited

U.S. PATENT DOCUMENTS 8,071,882 B2 * 12/2011 Okajima ............... H05K 1/028
                                                              174/250
2011/0157879 A1 * 6/2011 Chang ...................... F21S 9/03
                                                              362/183
(Continued)

FOREIGN PATENT DOCUMENTS

CN    102141222 A    8/2011
CN    102878484 A    1/2013
(Continued)

OTHER PUBLICATIONS

SIPO Office Action for Chinese Application No. 201480043657.4 dated Dec. 29, 2016 which corresponds to the above-referenced U.S. application.

(Continued)

*Primary Examiner* — Elmito Breval
*Assistant Examiner* — Michael Chiang
(74) *Attorney, Agent, or Firm* — LRK Patent Law Firm (57) ABSTRACT

A circuit board, and a lighting device and board housing module having the circuit board. The circuit board includes a support substrate having a first region and a second region bent from the first region, light emitting devices disposed on the first region, and a protective support portion protruding more than the light emitting devices from the support substrate of the first region.

16 Claims, 9 Drawing Sheets

(51) Int. Cl.
*F21S 4/28* (2016.01)
*F21Y 105/00* (2016.01)
*F21Y 103/10* (2016.01)
*F21Y 115/10* (2016.01)

(52) U.S. Cl.
CPC ..... G02B 6/0093 (2013.01); G02F 1/133615 (2013.01); *F21Y 2103/10* (2016.08); *F21Y 2105/00* (2013.01); *F21Y 2115/10* (2016.08)

(58) Field of Classification Search
CPC .... G02B 6/009; G02B 6/0091; G02B 6/0093; G02B 6/0028; G02F 1/133615
USPC .................. 362/611–613, 631–634, 609–611
See application file for complete search history.

(56) References Cited

U.S. PATENT DOCUMENTS

| | | | |
|---|---|---|---|
| 2011/0175120 A1 | 7/2011 | Yoon et al. | |
| 2012/0014135 A1 | 1/2012 | Kim | |
| 2012/0236228 A1* | 9/2012 | Tang | G02F 1/133615 349/61 |
| 2012/0249886 A1* | 10/2012 | Kuromizu | G02B 6/0088 348/725 |
| 2012/0281151 A1* | 11/2012 | Abe | G02B 6/0091 348/739 |
| 2012/0293728 A1* | 11/2012 | Yokohama | G02B 6/0088 348/739 |
| 2013/0050612 A1* | 2/2013 | Hur | G02F 1/133603 349/62 |
| 2014/0320747 A1* | 10/2014 | Kamada | G02B 6/0085 348/725 |

FOREIGN PATENT DOCUMENTS

| | | |
|---|---|---|
| CN | 202791663 U | 3/2013 |
| EP | 1646086 A1 | 4/2006 |
| KR | 10-2013-0030619 A | 3/2013 |
| KR | 10-2013-0053873 A | 5/2013 |

OTHER PUBLICATIONS

Search Report and Written Opinion for International Application No. PCT/KR2014/004067.

\* cited by examiner

CIRCUIT BOARD AND LIGHTING DEVICE AND BOARD HOUSING MODULE HAVING THE CIRCIUT BOARD

CROSS-REFERENCE TO RELATED APPLICATION

This application is the U.S. national stage application of International Application No. PCT/KR2014/004067, filed May 8, 2014, which claims priority to Korean Application No. 10-2013-0062936, filed May 31, 2013, the disclosures of each of which are incorporated herein by reference in their entirety.

TECHNICAL FIELD

Embodiments of the present invention relate to a circuit board, and a lighting device and a board housing module having the circuit board.

BACKGROUND ART

Figure 1:
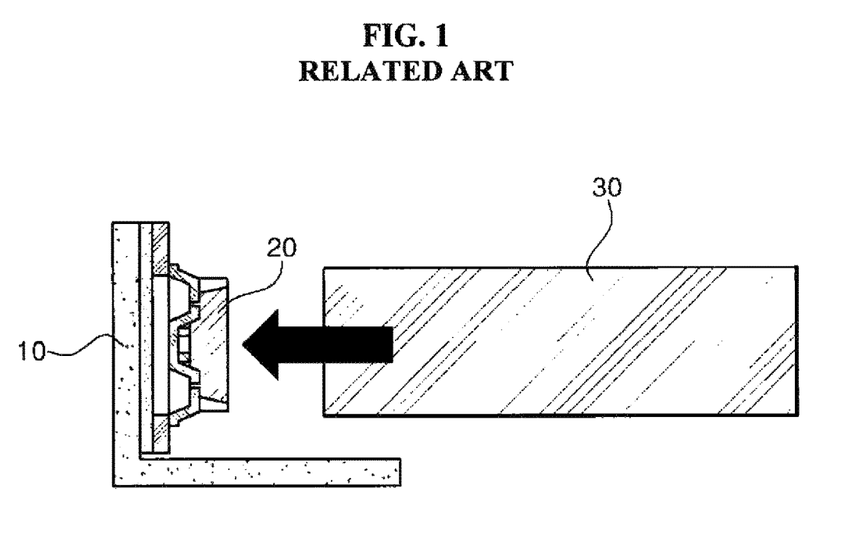
FIG. 1 is a left side view illustrating a circuit board and a light guide plate according to a conventional art.

FIG. 1 is a view illustrating a circuit board and a light guide plate according to a conventional art.

Referring to FIG. 1, the circuit board includes: a support substrate 10; an insulating layer on the support substrate 10; and light emitting devices 20, such as light emitting diodes (LEDs) mounted to a conductive pattern on the insulating layer. A lighting device may be formed by providing the circuit board and a light guide plate 30 for guiding light of the light emitting devices 20.

However, when the lighting device is operated, the light guide plate 30 expands due to heat generated from the light emitting devices 20, so the light emitting devices 20 are frequently damaged.

Accordingly, a way to protect the light emitting devices 20 from the light guide plate 30 has been practically needed.

DISCLOSURE OF INVENTION

Technical Problem

An aspect of embodiments of the present invention may provide a circuit board which can protect light emitting devices from a light guide plate, which expands due to heat, using a support substrate.

Another aspect of embodiments of the present invention may provide a circuit board may provide a lighting device including a circuit board which enables a distance between a light emitting device and a light guide plate to be secured through a protective support portion using a support substrate.

A further aspect of embodiments of the present invention may provide a lighting device or a board housing module which can prevent light emitting devices from being damaged by a light guide plate, which expands due to heat, using a board housing which covers a support substrate.

Yet another aspect of embodiments of the present invention may provide a board housing module which can protect light emitting devices from a thermally expanding light guide plate using a support substrate of a circuit board and a board housing supporting the support substrate.

Solution to Problem

According to an aspect of the embodiments of the present invention, a circuit board may include: a support substrate having a first region and a second region bent from the first region; light emitting devices on the first region; and a protective support portion protruding more than the light emitting devices from the support substrate of the first region.

According to another aspect of the embodiments of the present invention, a lighting device may include: a support substrate having a first region and a second region bent from the first region; light emitting devices on the first region; a protective support portion protruding more than the light emitting devices from the support substrate of the first region; and a light guide plate over a light emitting surface of the light emitting devices.

The protective support portion may include at least one of a first portion of the support substrate bent to be parallel to the second region at the first region and a second portion of the support substrate bent to be parallel to the first region at the second region.

The first portion may have an end part bent to be parallel to the first region or the second portion may have an end part bent to extend in a direction parallel to the second region.

The first portion and the second portion may be spaced apart from each other or may be connected to each other.

The circuit board or the lighting device may further include an insulating layer between the support substrate and the light emitting device and a conductive pattern on which the light emitting devices are mounted. The insulating layer may include a first insulating layer and a second insulating layer divided with the protective support portion as the center.

The circuit board or the lighting device may further include a buffer layer on the protective support portion and made of a resin material, a non-conductive material or a material having lower conductivity than that of the support substrate.

The circuit board or the lighting device may further include a board housing supporting the support substrate, wherein the protective support portion may have a through hole of the first region or the second region, and a projection protruding from the board housing and passing through the through hole.

According to further aspect of the embodiments of the present invention, a board housing module may include: a support substrate having a first region and a second region bent from the first region; light emitting devices on the first region; a through hole of the first region or the second region; a board housing supporting the support substrate at one or more surface of the support substrate; and an outer support portion passing through the through hole from the board housing and protruding more than the light emitting devices from the support substrate.

The board housing module may further include an insulating layer between the support substrate and the light emitting device and a conductive pattern on the insulating layer and for mounting the light emitting devices. The insulating layer may include a first insulating layer and a second insulating layer divided with the outer support portion as the center.

The board housing module may further include a buffer layer on the outer support portion and made of a resin material, a non-conductive material or a material having lower conductivity than that of the support substrate.

Advantageous Effects of Invention

As set forth above, according to some embodiments of the present invention, since a part of the support substrate protrudes so as to extend between the light emitting device and the light guide plate, the light emitting devices can be prevented from being damaged by the light guide plate by blocking the light guide which expands due to heat of the light emitting devices.

According to some embodiments of the present invention, since the protective support portion having various structures is formed using the support substrate having the first region and the second region bent from the first region, the light emitting devices can be protected from the light guide plate thanks to the protective support portion having various structures. It is advantageous in that a degree of freedom in design of the circuit board can be improved because the structures of the protective support portion may be optionally selected and used according to various structures and shapes of the circuit board.

According to some embodiments of the present invention, as a part of the board housing supporting the support substrate is disposed as the protective support portion extending via an opening or the through hole of the support substrate, the light emitting devices can be reliably protected from the light guide plate, and a degree of freedom in design of a lighting device including the circuit board or a board housing module including the circuit board can be improved thanks to various structures of the protective support portion.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

MODE FOR THE INVENTION

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

A circuit board, which will be described below, refers to a circuit board which is configured such that an insulating layer (see reference numeral 22 of FIG. 3) is formed in at least one region (a first region) of a bending type support substrate, a conductive pattern (see reference numeral 24 of FIG. 3) is formed on the insulating layer, and thereafter, light emitting devices are mounted to a specific part (a pad portion) of the conductive pattern.

Figure 2:
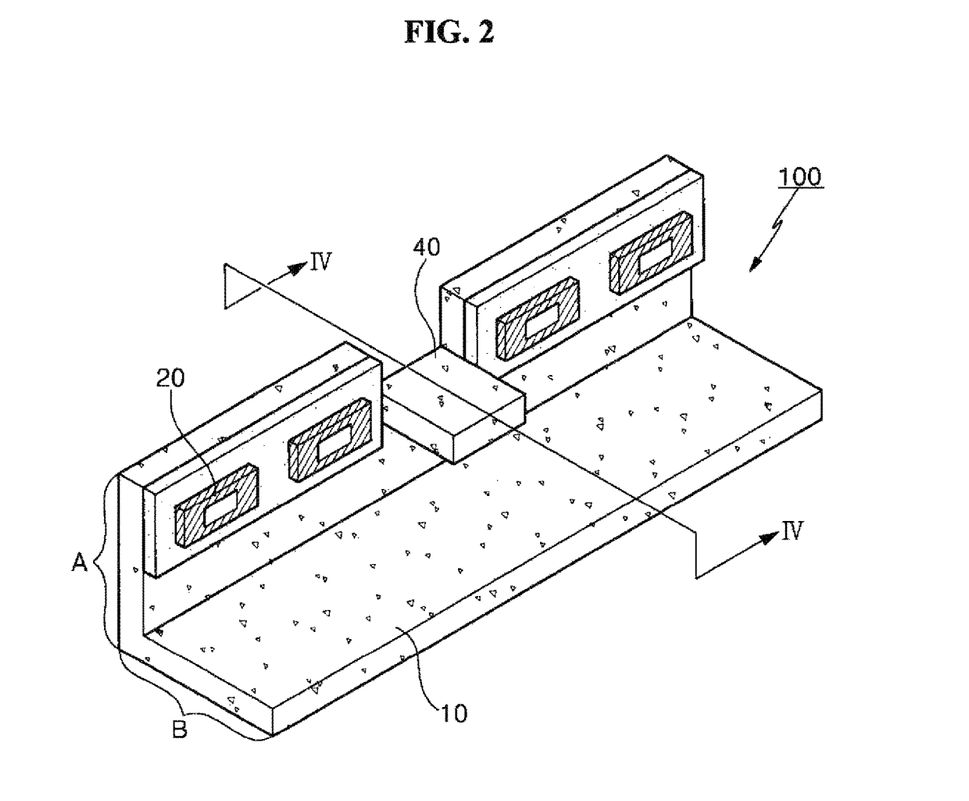
FIG. 2 is a perspective view of a circuit board according to an embodiment of the present invention.
Figure 3:
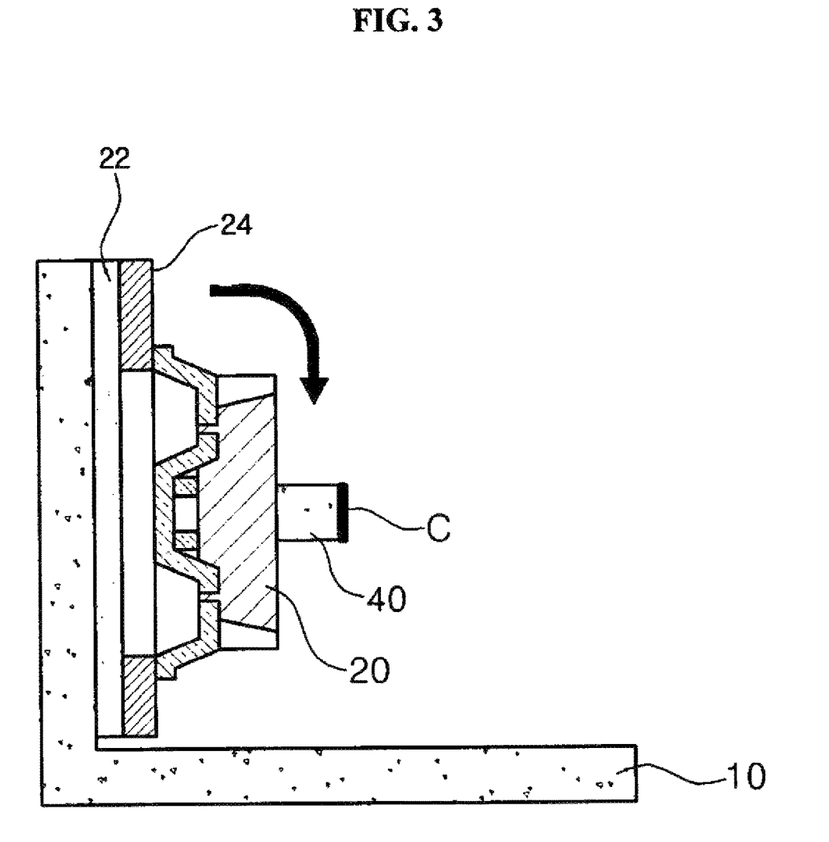
FIG. 3 is a schematic left side view of the circuit board of FIG. 2.

FIG. 2 is a perspective view of a circuit board according to an embodiment of the present invention. FIG. 3 is a schematic left side view of the circuit board of FIG. 2.

Referring to FIGS. 2 and 3, a circuit board 100 includes: a support substrate 10; a light emitting module in which a light emitting device 20 is mounted to the support substrate 10; and a protective support portion 40 which is configured such that the support substrate 10 corresponding to a spaced portion between the light emitting device 20 and an adjacent light emitting device is formed to protrude in a direction of the light emitting module.

The protective support portion 40 is disposed between the light emitting device and the light guide plate in order to prevent the light emitting device 20 from being damaged by the light guide plate which expands due to heat when the circuit board 100 is provided and utilized in a lighting device or a flat panel display.

In the present embodiment, the protective support portion 40 is provided by utilizing the support substrate 10 which has been already used, and accordingly, production processes can be simplified, and material costs can be reduced.

The protective support portion 40 is formed to protrude more than a thickness W of the light emitting device 20 mounted to the support substrate 10, thereby preventing the light emitting device 20 from being damaged due to the light guide plate. The protective support portion 40 may be formed to protrude up to a separation space between the protective support portion 40 and the light guide plate, but the protective support portion may be formed not to come into contact with the light guide plate.

The support substrate 10 may include a first region A and a second region B extending to be bent from the first region A. Accordingly, the protective support portion 40 may be configured such that the support substrate 10 of at least one region of the first region A and the second region B is formed to protrude.

The light emitting device 20 is mounted to the first region A of the support substrate 10. At this time, the protective support portion 40 may be configured such that the support substrate 10 of the first region A is formed to protrude more than a thickness W of the light emitting device 20.

One surface C of the protective support portion 40 toward the light guide plate may be coated with at least one of a resin material, a non-conductive material, and a material having lower conductivity than that of the support substrate in order to form a buffer layer.

In the present embodiment, an insulating layer is disposed between the support substrate 10 and the light emitting device 20. A conductive pattern on which the light emitting device 20 is mounted, or a pad portion connected to the conductive pattern is provided on the insulating layer. At this time, the protective support portion 40 protrudes between the insulating layer and an adjacent insulating layer, and accordingly, the insulating layer may be divided into a first insulating layer arranged at one side and a second insulating layer arranged at another side with the protective support portion 40 as its center.

Figure 4:
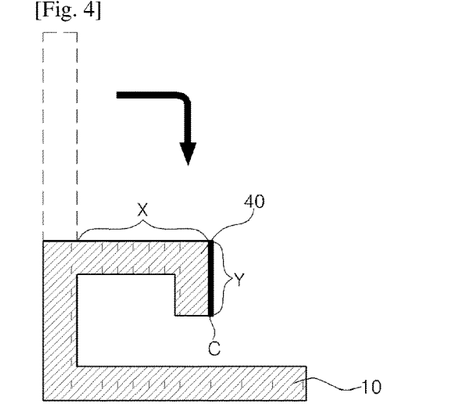
FIGS. 4 and 5 are cross-sectional views for modifications of a protective support portion of the circuit board of FIG. 2.
Figure 5:
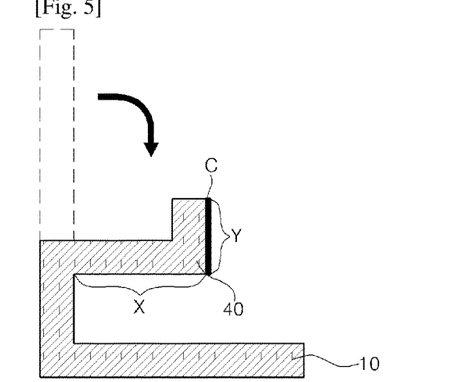

FIGS. 4 and 5 are cross-sectional views for modifications of a protective support portion of the circuit board of FIG. 2. FIGS. 4 and 5 correspond to cross sections taken along lines IV-IV in the circuit board 100 of FIG. 2.

Referring to FIGS. 4 and 5, the protective support portion 40 may be formed of a first portion X protruding from the first region A in a thickness direction of the light emitting device 20, and a second portion Y bent from the first portion X to a lower surface (see FIG. 4). At this time, one end of the second portion Y may come into contact with the second region B. That is, when the second portion Y and the second region B come into contact with each other, the protective support portion 40 is formed in Korean character " ㅣ "-like shape so that the light emitting device 20 can be more stably protected from the light guide plate.

For example, the support substrate 10 is formed to protrude in the thickness direction of the light emitting device 20, and when a protruding portion comes into contact with the light guide plate, a part of the protruding portion is bent, thereby enabling the support substrate to be bent into an upper surface and a lower surface. Also, in FIGS. 4 and 5, even though the support substrate is formed to be bent in an arrow direction only once, the protective support portion may be formed in various shapes by bending the support substrate several times in a stepped form.

Accordingly, in the present embodiment of the invention, a portion protruding from the support substrate 10 in the thickness direction of the light emitting device 20 may be the first portion X and a portion bent from the first portion X may be the second portion Y. At this time, a position protruding from the first region A of the protective support portion 40 may be located at the lower part of a lower side surface of the light emitting device 20.

Alternatively, the protective support portion 40 may be formed of the first portion X protruding from the first region A in the thickness direction of the light emitting device 20, and the second portion Y bent from the first portion X to an upper surface (see FIG. 5). At this time, one end of the second portion Y comes into contact with a board housing supporting the circuit board 10 so that the light emitting device 20 can be more stably protected from the light guide plate.

Also, one surface C of the protective support portion 40 toward the light guide plate may be coated with at least one material of a resin material, a conductive material, a material having lower conductivity than that of the support substrate 10. This is because the support substrate is made of Al, Au, Ag, Cr, an organic compound, an inorganic compound, a magnetic material, a conductive material or the like, and thus the support substrate 10 may rapidly expand locally due to its excellent conductivity when a part of the support substrate 10 utilized as the protective support portion 40 comes into direct contact with the light guide plate. Accordingly, as one surface of the protective support portion 40 toward the light guide plate is coated with the resin material, non-conductive material or the material having lower conductivity than that of the substrate 10, the protective support portion can stably the light emitting device 20 without expanding even when heat is generated due to the light guide plate.

Figure 6:
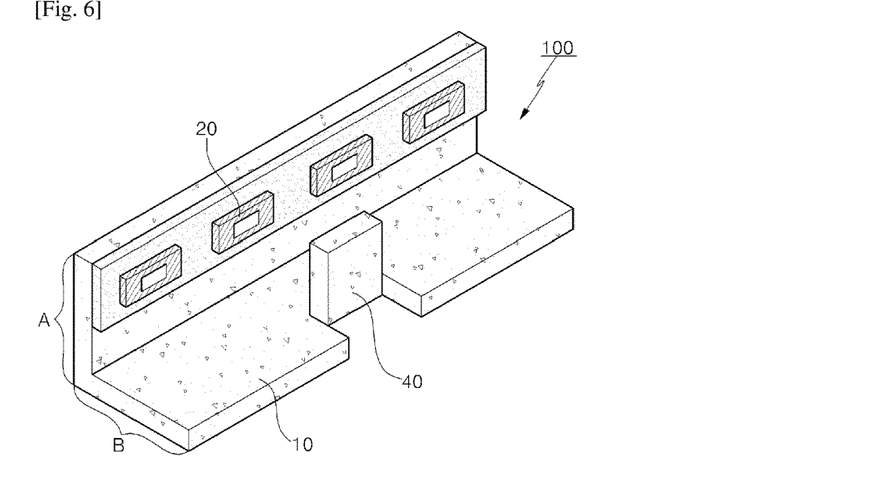
FIG. 6 is a perspective view of a circuit board according to another embodiment of the present invention.
Figure 7:
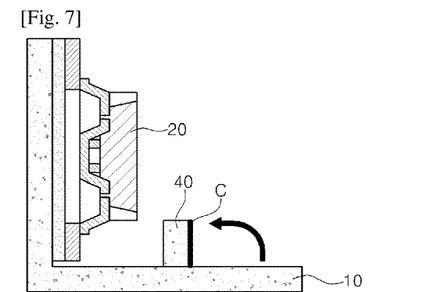
FIG. 7 is a schematic left side view of the circuit board of FIG. 6.

FIG. 6 is a perspective view of a circuit board according to another embodiment of the present invention. FIG. 7 is a schematic left side view of the circuit board of FIG. 6.

Referring to FIGS. 6 and 7, the circuit board 100 includes: the support substrate 10 having the first region A and the second region bent from the first region A; the light emitting module in which the light emitting device 20 is mounted on the support substrate 10; and the protective support portion 40 which is configured such that the support substrate 10 of the second region B protrudes to a side to which the light emitting device 20 is mounted.

The protective support portion 40 provided in the second region B may be formed to protrude less than a height of a lower side surface of the light emitting device 20 regardless of a spaced portion between the light emitting device 20 and an adjacent light emitting device. That is, when the protective support portion 40 is provide using the support substrate 10 of the second region B regardless of the spaced portion between the light emitting device 20 and the adjacent light emitting device, the protective support portion 40 may be implemented less than the height of the lower side surface of the light emitting device 20 so as not to cover the light emitting device 20.

Meanwhile, like the protective support portion 40 formed in the second region, when the protective support portion 40 is provided using the support substrate 10 of the first region A corresponding to a spaced portion between the adjacent light emitting devices, a spaced portion between the plurality of light emitting modules, or a spaced portion between the insulating regions to which the light emitting modules are mounted, the protective support portion 40 may be also implemented regardless of the position of the light emitting device 20. This is because the light emitting device 20 is not covered by the support substrate 10 of the first region A even though the support substrate 10 protrudes in a direction in which the light emitting module is mounted.

Figure 8:
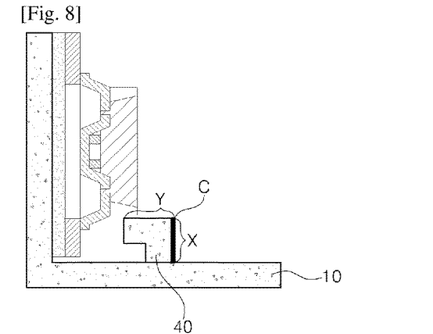
FIGS. 8 and 9 are schematic left side views for modifications of a protective support portion of the circuit board of FIG. 7.
Figure 9:
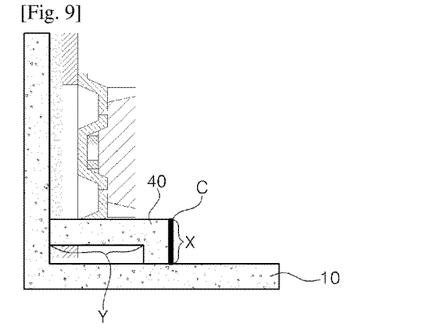

FIGS. 8 and 9 are schematic left side views for modifications of a protective support portion of the circuit board of FIG. 7.

Referring to FIGS. 8 and 9, the protective support portion 40 may be formed of the first portion X protruding less than a height of a lower side surface of the light emitting device 20 from the second region B, and the second portion Y bent from the first portion X in a direction of the first region A. At this time, one end of the second portion Y may not come into contact with the first region A (see FIG. 8).

Also, one end of the second portion Y may come into contact with the first region A. That is, when the second portion Y and the first region A come into contact with each other, the protective support portion 40 is formed in a Korean character " ㅣ "-like shape so that the light emitting device 20 can be more stably protected from the light guide plate (see FIG. 9).

Also, one surface C of the protective support portion 40 toward the light guide plate may be coated with at least one of a resin material, a non-conductive material, and a material having lower conductivity than that of the support substrate.

Figure 10:
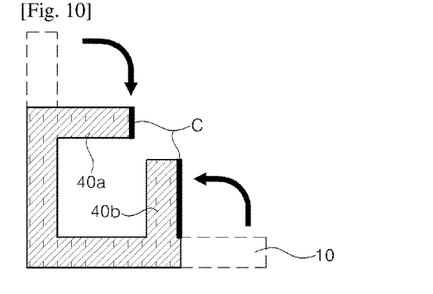
FIG. 10 is a schematic cross-sectional view of a protective support portion of a circuit board according to further embodiment of the present invention.

FIG. 10 is a schematic cross-sectional view of a protective support portion of a circuit board according to further embodiment of the present invention.

Referring to FIG. 10, the protective support portion 40 may include: a first protective support portion 40a in which the support substrate 10 of the first region A is formed to protrude; and a second protective support portion 40b in which the support substrate 10 of the second region B is formed to protrude. At this time, the first protective support portion 40a and the second protective support portion 40b may be formed not to come into contact with each other. Also, one surface C of the first protective portion 40a and the second protective portion 40b toward the light guide plate may be coated with at least one of a resin material, a non-conductive material, and a material having lower conductivity than that of the support substrate.

Of course, one end of the first protective support portion 40a and one end of the second protective support portion 40b may be formed to come into contact with each other.

Figure 11:
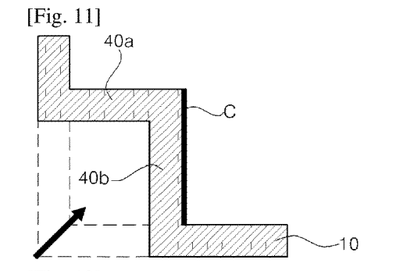
FIG. 11 is a schematic cross-sectional view of a protective support portion of a circuit board according to yet another embodiment of the present invention.

FIG. 11 is a schematic cross-sectional view of a protective support portion of a circuit board according to yet another embodiment of the present invention.

Referring to FIG. 11, the protective support portion 40 according to the present embodiment is provided such that a part of the support substrate 10 of the first region A, a part of the support substrate 10 of the second region B, and a curve portion between the first region and the second region protrude to a space partially limited by the first region A and the second region B.

The space partially limited by the first region A and the second region B may be defined as a space which is present in a range in which the first region A and the second region B form a right angle, provided that a first direction in which a cross section of the first region A extends and a second direction in which a cross section of the second region extends cross at right angles. In the aforesaid case, a separation distance (a second separation distance) between one surface C of the protective support portion 40 and the support substrate 10 of the first region A is larger than a separation distance (a first separation distance) between a light emitting surface of the light emitting module or the light emitting device and the support substrate of the first region A. Here, one surface of the protective support portion 40 corresponds to an end part or one end part of the protective support portion, and the light emitting surface of the light emitting module or the light emitting device corresponds to one surface of the light emitting device or the light emitting module. Here, the one surface of the light emitting module may refer to a portion of the light emitting module which is positioned farthest from the support substrate 10 of the first region A.

According to the present embodiment, when the circuit board 100 is provided and utilized in a lighting device or a flat panel display, the light emitting device 20 can be efficiently prevented from being damaged by the light guide plate.

Figure 12:
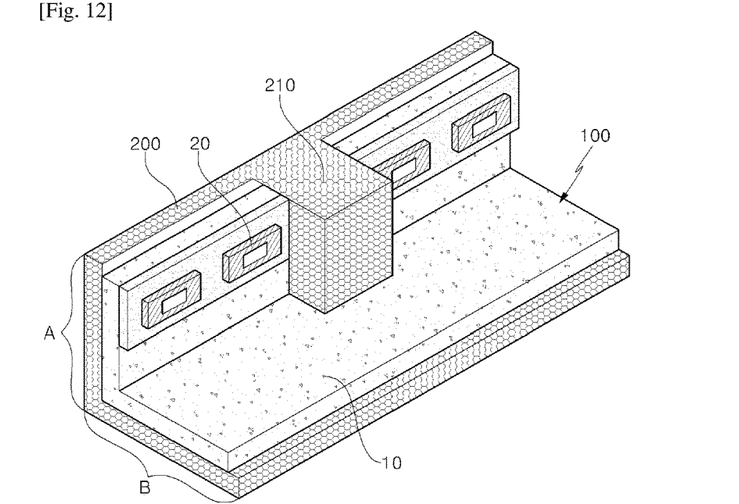
FIG. 12 is a perspective view of a board housing module according to an embodiment of the present invention.
Figure 13:
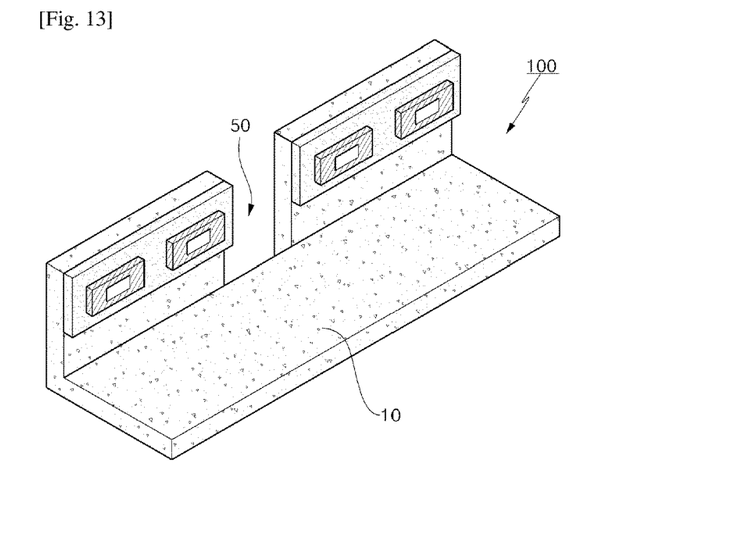
FIG. 13 is a perspective view of a circuit board of the board housing module of FIG. 12.

FIG. 12 is a perspective view of a board housing module according to an embodiment of the present invention. FIG. 13 is a perspective view of a circuit board of the board housing module of FIG. 12.

Referring to FIGS. 12 and 13, the board housing module includes: a through hole formed in the first region A of the circuit board 100 to which the light emitting device 20 is mounted, or the circuit board 100 corresponding to a spaced portion between the light emitting device 20 and the adjacent light emitting device, (see reference numeral 50 of FIG. 13); a housing 200 covering another surface of the circuit board 100; and an outer support portion 210 in which a protruding portion (projection) is inserted into the through hole 50 from the substrate housing 200.

The outer support portion 210 is formed between the light emitting device and the light guide plate in order to prevent the light emitting device from being damaged by the light guide plate when the circuit board 100 is provided and utilized in a lighting device or a flat panel display.

As such, the present embodiment of the invention relates to a way to simplify manufacturing processes and to reduce material costs by utilizing the substrate housing 200 which supports the circuit board.

The outer support portion 210 may be configured such that the protruding portion is formed to protrude more than the thickness of the light emitting device 20. The outer support portion 210 is formed to protrude up to a separation space between the light emitting device 20 and the light guide plate, but the outer support portion may be formed not to come into contact with the light guide plate.

In the present embodiment, the circuit board 100 may include the first region A and the second region B extending to be bent from the first region A. The circuit board 100 may be configured such that a through hole 50 is formed in the first region A or the second region B corresponding to the space portion between the light emitting device 20 and the adjacent light emitting device. Accordingly, the outer support portion 210 may be configured such that a protruding portion is inserted into the through hole 50 formed in the circuit board 100 of at least one region of the first region A and the second region B.

Also, in the present embodiment, the light emitting device 20 is mounted to the first region A of the circuit board 100. The circuit board 100 has the through hole 50 formed in the first region A corresponding to the spaced portion between the light emitting device 20 and the adjacent light emitting device, and the outer support portion 210 is implemented in the though hole 50 formed in the first region A so that the protruding portion protrudes to a side to which the light emitting modules or the light emitting devices are mounted.

At this time, the insulating layer disposed between the support substrate 10 and the light emitting device 20 may include the first insulating layer and the second insulating layer which are divided with the outer support portion 210 as the center.

Figure 14:
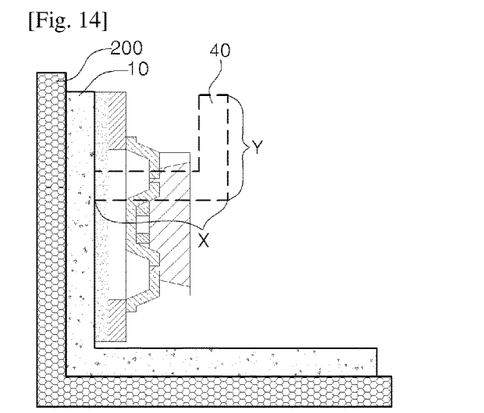
FIGS. 14 to 16 are schematic left side views for modifications of the board housing module of FIG. 12.
Figure 15:
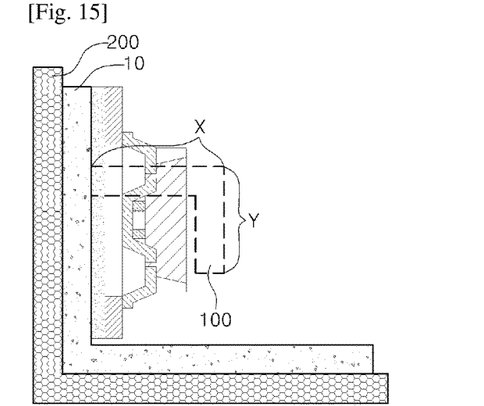
Figure 16:
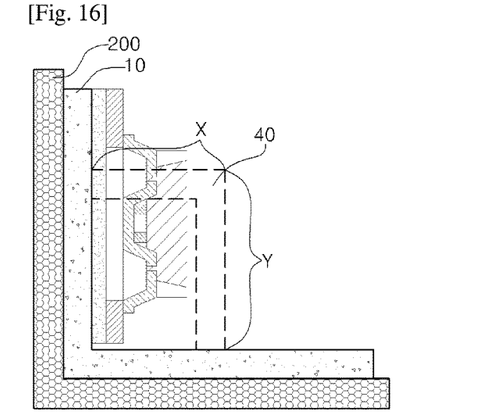

FIGS. 14 to 16 are schematic left side views for modifications of the board housing module of FIG. 12.

Referring to FIGS. 14 to 16, the board housing module according to the present embodiment of the invention may further include the protective support portion provided as a part of the support substrate of the circuit board 100 in addition the outer support portion 210 of FIG. 12 (see reference numerals 40, 40a, and 40b of FIGS. 2 to 5, FIG. 10 and FIG. 11). In this case, the outer support portion 210 and the protection support portion may be disposed to be complementary to each other. For example, the outer support portion 210 may be disposed to face a central part of one side surface of the light guide plate, and the protective support portion may be disposed to face both sides of the central part of the light guide plate at both sides of the outer support portion 210.

The detailed description on various shapes of the protective support portion is substantially identical to that on the protective support portion in the section regarding the aforesaid embodiments (FIGS. 4, 5 and 11), and accordingly, in the present embodiment, the description is omitted in order to avoid repeating of the contents.

Figure 17:
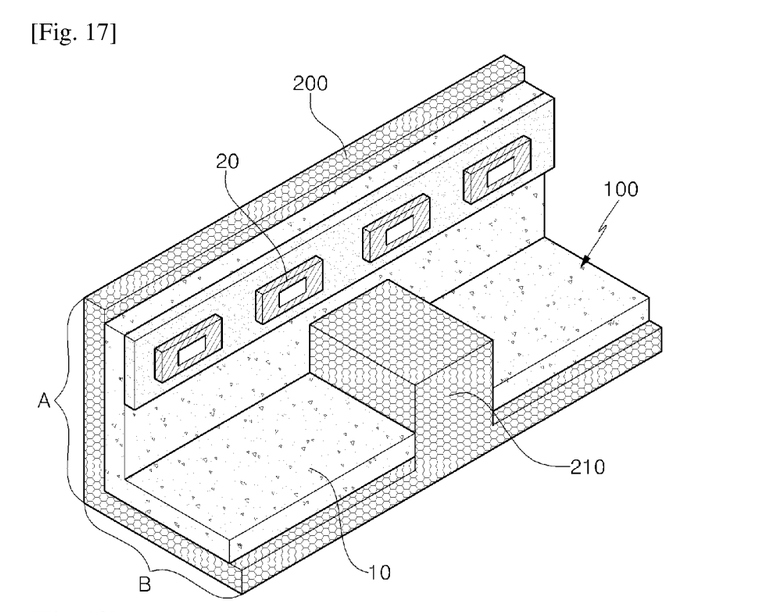
FIG. 17 is a perspective view of a board housing module according to another embodiment of the present invention.
Figure 18:
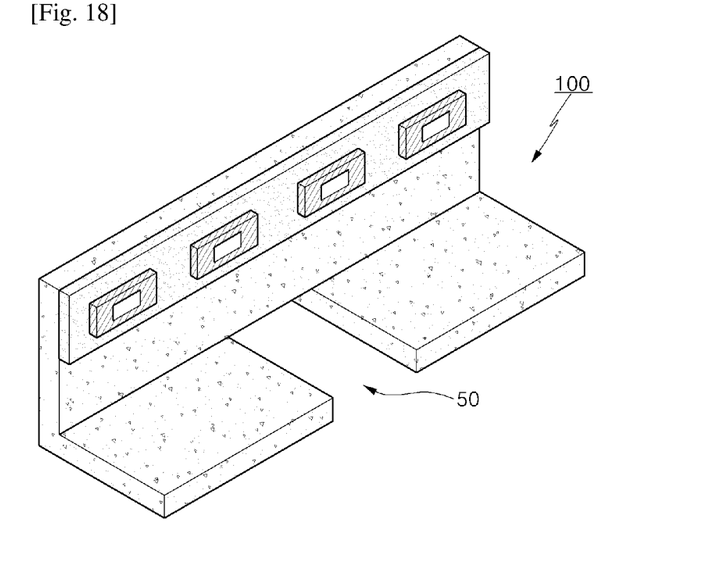
FIG. 18 is a perspective view of a circuit board of the board housing module of FIG. 17.

FIG. 17 is a perspective view of a board housing module according to another embodiment of the present invention. FIG. 18 is a perspective view of a circuit board of the board housing module of FIG. 17.

Referring to FIGS. 17 and 18, the board housing module according to the present embodiment includes: the circuit board 100 configured to mount the light emitting device 20 and having the first region A and the second region B extending to be bent from the first region A; the through hole 50 formed in the circuit board of the second region B; the board housing 200 supporting another surface of the circuit board 100; and the outer support portion 210 in a projection form extending from the board housing 200 and inserted into the through hole 50.

The outer support portion 210 formed in the second region B may be formed to protrude less than a height of the lower side surface of the light emitting device 20 regardless of the spaced portion between the light emitting device 20 and the adjacent light emitting device. Meanwhile, like the outer support portion formed in the first region A, when the outer support portion 210 is formed at the circuit board of the second region B corresponding to the spaced portion between the light emitting devices, the outer support portion 210 of the present embodiment may be formed regardless of a position of the light emitting device 20. This is because the light emitting device is not covered by the outer support portion 210 of the second region B even though the outer support portion protrudes via the through hole 50 in a direction of the light emitting module.

Figure 19:
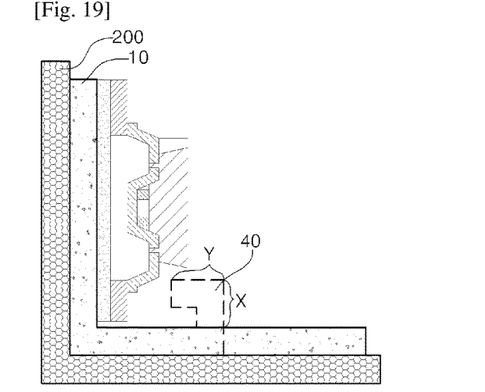
FIGS. 19 and 20 are schematic left side views for modifications of the board housing module of FIG. 17.
Figure 20:
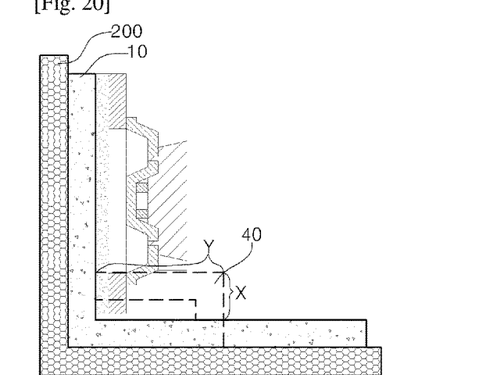

FIGS. 19 and 20 are schematic left side views for modifications of the board housing module of FIG. 17.

Referring to FIGS. 19 and 20, the board housing module according to the present embodiment may further include the protective support portion 40 provided as a part of the support substrate of the circuit board 100 in addition to the outer support portion 210 of FIG. 17. That is, the protective support portion 40 of the present embodiment may be disposed to be complementary to the outer support portion 210. For example, the outer support portion (see reference numeral 210 of FIG. 17) may be disposed to face a central part of one side surface of the light guide plate and the protective support portion 40 may be disposed to face both sides of the central part at both side of the outer support portion 210.

The protective support portion 40 may have various shapes, and the detailed description on various shapes overlaps with that on the protective support portion in the section regarding the aforesaid embodiments (FIGS. 8, 9 and 10), and accordingly, in the present embodiment, the description is omitted in order to avoid repeating of the contents.

Figure 21:
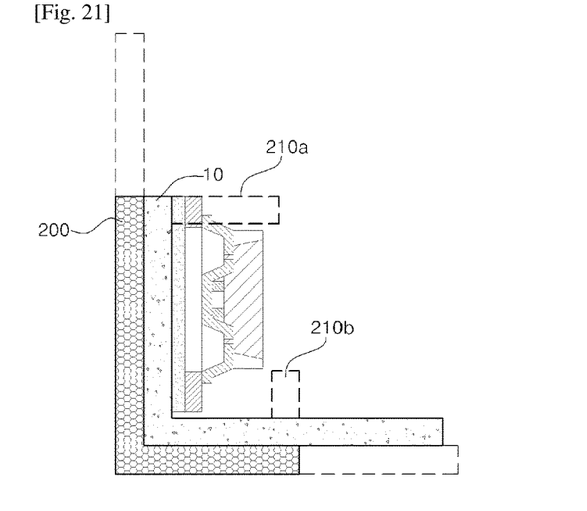
FIG. 21 is a left side view of a board housing module according to further embodiment of the present invention.

FIG. 21 is a left side view of a board housing module according to further embodiment of the present invention.

Referring to FIG. 21, the board housing module according to the present embodiment includes a plurality of outer support portions 210a, 210b that protrude to a side, in which the light emitting module is mounted, at the board housing 10 via a through hole provided in the first region of the support substrate 10 and a through hole provided in the second region of the support substrate 10.

That is, the outer support portion of the present embodiment may include: the first outer support portion 210a which is configured such that a protruding portion is inserted into the through hole formed in the first region A; and the second outer support portion 210b which is configured such that a protruding portion is inserted into the through hole formed in the second region B. At this time, the first outer support portion 210a and the second outer support portion 210b may be provided not to come into contact with each other. Also, one surface of the first outer support portion 210a and one surface C of the second outer support portion 210b may be coated with at least one of a resin material, a non-conductive material, and a material having lower conductivity than that of the support substrate in order to a buffer layer.

The aforesaid outer support portions 210a, 210b are disposed to be complementary to the protective support portion implemented by using a part of the support substrate 10 of the circuit board so that the light emitting devices can be effectively prevented from being damaged due to thermal expansion of the light guide plate.

As previously described, in the detailed description of the invention, having described the detailed exemplary embodiments of the invention, it should be apparent that modifications and variations can be made by persons skilled without deviating from the scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A circuit board comprising:
a support substrate having a first region and a second region bent from the first region;
light emitting devices disposed on the first region; and
a protective support portion protruding more than the light emitting devices from the first region of the support substrate,
wherein the protective support portion comprises a first portion protruding from the first region in a thickness direction of the light emitting devices, and a second portion bent from an end of the first portion to the second region to come into contact with the second region,
wherein the first portion is parallel to the second region, and the second portion is parallel to the first region, and
wherein a buffer layer is disposed on one surface of the second portion facing a light guide plate and made of a resin material, a non-conductive material or a material having lower conductivity than that of the support substrate.

2. The circuit board of claim 1, wherein the protective support portion is formed in a step form by bending the protective support portion several times.

3. The circuit board of claim 2, further comprising:
an insulating layer between the support substrate and the light emitting devices; and
a conductive pattern on which the light emitting devices are mounted.

4. The circuit board of claim 3, wherein the insulating layer comprises a first insulating layer and a second insulating layer, which are divided with the protective support portion as a center of the insulating layer.

5. The circuit board of claim 1, further comprising a board housing supporting the support substrate, wherein:
the support substrate comprises a through hole in the first region or the second region, and
the protective support portion comprises a projection protruding from the board housing and passing through the through hole.

6. A lighting device comprising:
a support substrate having a first region and a second region bent from the first region;
light emitting devices disposed on the first region;
a protective support portion protruding more than the light emitting devices from the first region of the support substrate; and
a light guide plate disposed over a light emitting surface of the light emitting devices,
wherein the protective support portion comprises a first portion protruding from the first region in a thickness direction of the light emitting devices, and a second portion bent from an end of the first portion to the second region to come into contact with the second region,
wherein the first portion is parallel to the second region, and the second portion is parallel to the first region, and
wherein a buffer layer is disposed on one surface of the second portion facing the light guide plate and made of a resin material, a non-conductive material or a material having lower conductivity than that of the support substrate.

7. The lighting device of claim 6, wherein the protective support portion is formed in a step form by bending the protective support portion several times.

8. The lighting device of claim 7, further comprising:
an insulating layer between the support substrate and the light emitting devices; and
a conductive pattern on which the light emitting devices are mounted.

9. The lighting device of claim 8, wherein the insulating layer comprises a first insulating layer and a second insulating layer, which are divided with the protective support portion as a center of the insulating layer.

10. The lighting device of claim 6, further comprising a board housing supporting the support substrate, wherein:
the support substrate comprises a through hole in the first region or the second region, and
the protective support portion comprises a projection protruding from the board housing and passing through the through hole.

11. A board, housing module comprising:
a support substrate having a first region and a second region bent from the first region;
light emitting devices disposed on the first region;
a through hole of the first region or the second region;
a board housing supporting the support substrate at one surface of the support substrate; and
an outer support portion passing through the through hole from the board housing and protruding more than the light emitting devices from the first region of the support substrate,
wherein the outer support portion comprises a first portion protruding from the first region in a thickness direction of the light emitting devices, and a second portion bent from an end of the first portion to the second region to come into contact with the second region, and
wherein the first portion is parallel to the second region, and the second portion is parallel to the first region.

12. The board housing module of claim 11, further comprising:
an insulating layer between the support substrate and the light emitting devices; and
a conductive pattern disposed on the insulating layer and for mounting the light emitting devices.

13. The board housing module of claim 12, wherein the insulating layer comprises a first insulating layer and a second insulating layer, which are divided with the outer support portion as a center of the insulating layer.

14. The board housing module of claim 11, further comprising a buffer layer disposed on one surface of the second portion facing a light guide plate and made of a resin material, a non-conductive material or a material having lower conductivity than that of the support substrate.

15. A board housing module comprising:
a support substrate having a first region and a second region bent from the first region;
light emitting devices disposed in on the first region;
a through hole of the first region or the second region;
a board housing supporting the support substrate at one surface of the support substrate; and
a protective support, portion protruding more than a thickness of each of the light emitting devices from the first region of the support substrate,
wherein the protective support portion comprises a first portion protruding from the first region in a thickness direction of the light emitting devices, and a second portion bent from an end of the first portion to the second region to come into contact with the second region,
wherein the first portion is parallel to the second region, and the second portion is parallel to the first region, and
wherein a buffer layer is disposed on one surface of the second portion facing a light guide plate and made of a resin material, a non-conductive material or a material having lower conductivity than that of the support substrate.

16. The board housing module of claim 15, wherein the protective support portion is formed in a step form by bending the protective support portion several times.

* * * * *